(12) United States Patent
Dahlfort et al.

(10) Patent No.: US 8,456,859 B2
(45) Date of Patent: Jun. 4, 2013

(54) SYSTEM CARD ARCHITECTURE FOR SWITCHING DEVICE

(75) Inventors: Stefan Dahlfort, Täby (SE); Einar Jan Vilhelm In De Betou, Stockholm (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 355 days.

(21) Appl. No.: 12/918,894

(22) PCT Filed: Feb. 27, 2008

(86) PCT No.: PCT/SE2008/050217
§ 371 (c)(1),
(2), (4) Date: Aug. 23, 2010

(87) PCT Pub. No.: WO2009/108092
PCT Pub. Date: Sep. 3, 2009

(65) Prior Publication Data
US 2011/0002108 A1 Jan. 6, 2011

(51) Int. Cl.
*H05K 7/14* (2006.01)
(52) U.S. Cl.
USPC .......................... 361/796; 370/352
(58) Field of Classification Search
USPC .......................... 361/796; 370/352
See application file for complete search history.

(56) References Cited

U.S. PATENT DOCUMENTS

| | | | |
|---|---|---|---|
| 5,062,801 A * | 11/1991 | Roos | 439/61 |
| 6,163,464 A * | 12/2000 | Ishibashi et al. | 361/788 |
| 6,392,142 B1 * | 5/2002 | Uzuka et al. | 174/541 |
| 6,704,307 B1 * | 3/2004 | Graves et al. | 370/372 |
| 6,816,486 B1 * | 11/2004 | Rogers | 370/387 |
| 7,099,340 B2 * | 8/2006 | Liva et al. | 370/401 |
| 2002/0162083 A1 * | 10/2002 | Fowler | 716/14 |
| 2003/0002541 A1 * | 1/2003 | Fowler et al. | 370/535 |
| 2003/0101426 A1 * | 5/2003 | Sarkinen et al. | 716/12 |
| 2003/0200330 A1 * | 10/2003 | Oelke et al. | 709/238 |
| 2004/0023558 A1 * | 2/2004 | Fowler et al. | 439/632 |
| 2005/0100340 A1 * | 5/2005 | Nishimura | 398/135 |
| 2006/0018260 A1 * | 1/2006 | Richmond et al. | 370/236.2 |
| 2006/0067069 A1 * | 3/2006 | Heard et al. | 361/796 |
| 2012/0014383 A1 * | 1/2012 | Geromel et al. | 370/352 |

* cited by examiner

Primary Examiner — Lisa Lea Edmonds

(57) ABSTRACT

It is an object of the present invention to provide switching equipment for communications networks, which switching equipment supports high-speed signalling between switch cards and line cards. Hence, the invention relates to a switching device for communications networks comprising a plurality of line cards and at least one switch card. The line cards comprise connection means arranged on or close to one edge of each line card, and the at least one switch card comprises matching connection means arranged on one flat side of said switch card. In this way, when said switch card is arranged substantially perpendicular to said line cards with said flat side of the switch card facing and at least partially overlapping said edges of the line cards, interconnection is achieved between the connection means of the line cards and the matching connection means of the at least one switch card.

9 Claims, 6 Drawing Sheets

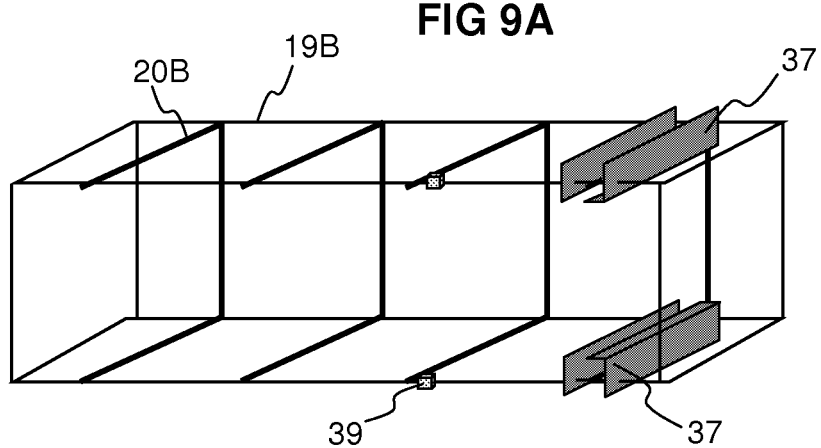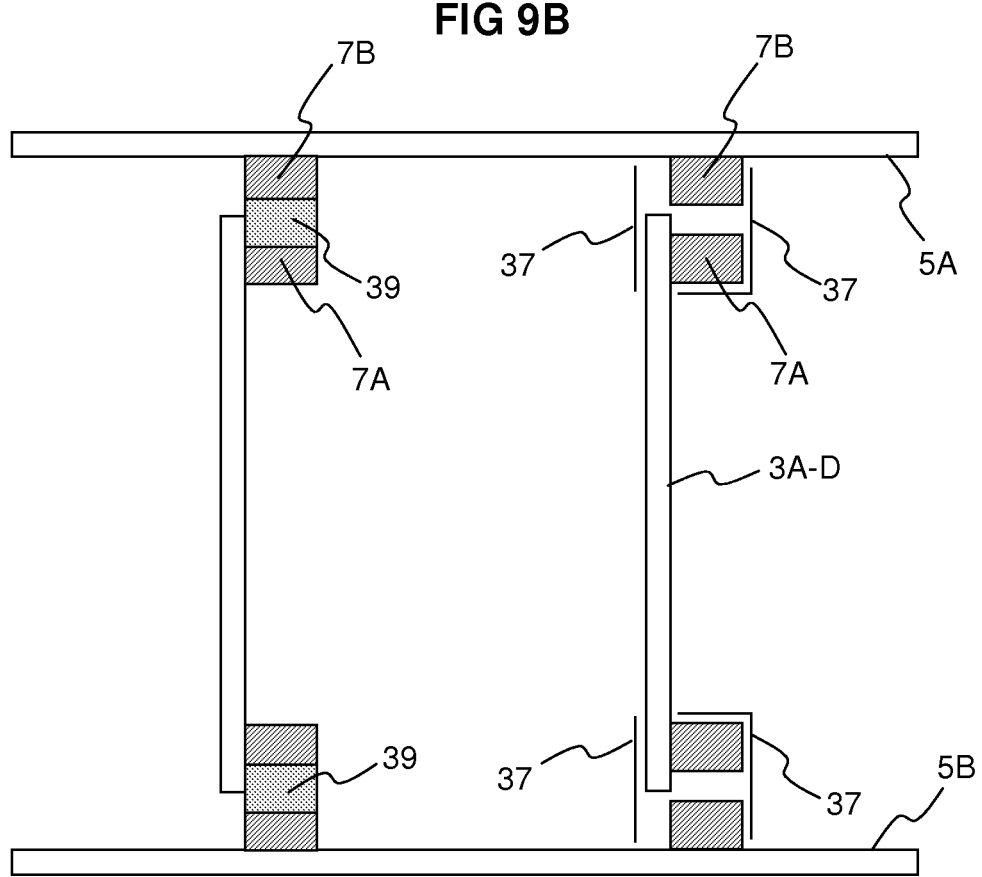

SYSTEM CARD ARCHITECTURE FOR SWITCHING DEVICE

TECHNICAL FIELD

The present invention relates to switching equipment in communication networks in general, and in particular to a new type of system card architecture in a network switching device.

BACKGROUND

In the fields of telecommunications and data communications, switching equipment is used to connect calls or data sessions between different nodes and/or users. The hardware that performs the switching is in general a modular system of electronic components contained in metal enclosure, sometimes referred to as "shelf", "rack" or a "chassis". Typically, a plurality of such shelves is contained in a switch cubicle or frame. A frame that comprises one or several shelves and is connected to a network is sometimes referred to as a switching node, or, in the context of circuit switched networks, a network element.

Normally, each shelf comprises a plurality of line cards and one or two switch cards which are all edgeways inserted in the shelf in parallel with each other and brought into electric contact with an electrical backplane that is edgeways arranged perpendicular to the cards in the back of the shelf. The line cards and the switch card(s) are then able to communicate with each other by means of electrical signals conveyed to one another via the electrical backplane. This arrangement, comparable to a bookshelf stuffed with books, is advantageous in that all active cards can be replaced from the front side of the shelf, a feature that is of particular importance in service and fault situations. This type of switch architecture, having one common backplane through which all line cards and switch cards are connected, is called star switching architecture. In case the line cards connect to two switch cards via the backplane, the architecture is called dual star.

One modular standard giving more detailed information about the configuration of a state of the art switching shelf is the MicroTCA™ (Micro Telecommunications Computing Architecture) standard that specifies a number of requirements for a system that intend to connect PICMG® Advanced Mezzanine Cards (Advances MCs) directly to a backplane interconnect. More information about PICMG® and the MicroTCA™ standard can be found on the Internet, e.g. on the addresses http://www.picmg.org/index.htm (Jan. 1, 2008), and http://www.picmg.org/pdf/MicroTCA_Short_Form_Sept_2006.pdf (2008 Jan. 22), respectively.

Today, communications networks are at an increasing pace reaching closer to the end-users, with increasing bandwidths. Therefore, these networks put increasing requirements on the network equipment in terms of node capacities. For example, in a few years 100 Gbit/s interfaces are expected to serve large nodes. In such systems, the internal communication capacity between the cards, e.g. using star or dual star switching architectures, needs to be very high.

A problem with electrical backplanes of today arises when high-speed signals, in the order of 10 Gbit/s, need to travel long distances over the backplane or if a large number of high speed signals are needed. For example, implementing a 100 Gbit/s line card can be done using 10×10 Gbit/s line cards but this imposes a serious overall space problem with current backplane technology.

Today, this problem is partially solved by using advanced high-speed electrical connectors, advanced multi-layer backplanes, and advanced signal distortion equalizers which eliminate or at least reduce signal distortion. Together these components impose increased system size, cost and complexity. In other words, when the port speeds of a switching device increases it is important that the system interconnect can keep up in pace to prevent the system dimensions from growing and the port density from decreasing. With port speeds reaching 40 Gbit/s and eventually 100 Gbit/s, systems are in part limited by the backplane capacity. To let these systems grow in size is not a satisfactory solution, not only because they occupy more space but since the capacity on the electrical backplane links decrease with increasing signalling distance. Passive electrical backplanes connecting the different line cards and switching card(s) thus offer a cost-effective mean of carrying power and low speed signals but impose a bottleneck for high-speed signals.

To avoid some of the above limitations set by electrical backplanes, optical backplane interconnect have been suggested. With optical backplane interconnects, the line cards and the switch card(s) are equipped with fibre-optic transmitters/receivers (transceivers) connecting the cards with the optical backplane which in turn includes optical fibres or other forms of waveguides for conveying the optical signals between the various cards. However, optical backplane interconnect equipment of today come at a high cost, in part due to the need for optical connectors. Thus, optical backplanes have found limited market interest so far.

There is thus a need for improved switching equipment for telecommunications and data communications networks.

SUMMARY OF THE INVENTION

It is an object of the present invention to provide switching equipment for communications networks, which switching equipment supports high-speed signalling between switch cards and line cards.

Hence, the invention relates to a switching device for communications networks comprising a plurality of line cards and at least one switch card. The line cards comprise connection means arranged on or close to one edge of each line card, and the at least one switch card comprises matching connection means arranged on one flat side of said switch card. In this way, when said switch card is arranged substantially perpendicular to said line cards with said flat side of the switch card facing and at least partially overlapping said edges of the line cards, interconnection is achieved between the connection means of the line cards and the matching connection means of the at least one switch card.

By providing a switching device in which the at least one switch card is arranged perpendicular to the line cards, the switch card can communicate directly with each line card. Thereby, the present need for a backplane conveying signals between the line cards and the switch card(s) in switching devices of today is eliminated.

The elimination of the backplane in the switching device according to the invention gives many advantages compared to prior-art switching devices for communication networks. The switching device can be made smaller in size and manufactured at a lower cost due to the reduction of required components. The signals between the line cards and the switch card(s) do no longer have to make a detour via a backplane which greatly reduces the overall signal travel distance and allows for high-speed signalling between the line cards and switch card(s) since the limitations previously imposed by backplane capacity are eliminated.

The switching device may also comprise two switching cards in which case these cards are arranged on two opposite sides of, and substantially perpendicular to, the line cards, thus forming a dual star architecture. This is advantageous if redundant switching cards are needed, which is often required as a system option by network operators.

Optionally, the switching device further comprises a backplane card to carry power and potentially low speed control signals to the cards of the system. As the high-speed signals between the line cards and switch card(s) do not have to go via the backplane, such an additional backplane can be made small in size.

Preferably, the card-to-card communication in the switching device is realized by means of free-space optical interconnects (FSOI), in which case the line cards and the switch card(s) comprise optical transmitters and receivers. Free-space optical interconnects are feasible and practical due to the new type of switch architecture offered by the present invention, which allows for a very short distance between the various system cards (a few cm or even less). By rendering possible the use of free-space interconnects, the present invention can benefit from the high port speeds offered by optical interconnects but yet eliminate the need for optical connectors which are both costly and difficult to use since both of the communicating cards preferably should be allowed to move relative to each other in order to remove/insert cards in service and fault situations.

The line cards, switch card(s) and any additional backplane card are typically mounted within an enclosure or chassis, similar to the well-known switching shelf chassis used today. According to one embodiment, the line cards and switch card(s) are first inserted into a system card thread frame arrangement which in turn may be inserted into a chassis.

When free-space optical interconnects are used for the card-to-card communication, the line cards, the switch card(s), the above mentioned frame arrangement and/or a chassis in which the system cards are arranged can comprise cleansing devices for cleaning the optical transmitters and receivers of each card that is inserted into or removed from the system. In this way, dust that could otherwise deteriorate the card-to-card communication is removed from the optical interconnect interface each time a new card is inserted. The cleansing device can be a brush-like device, a soft and resilient polishing cushion, or the like.

The present invention also relates to a line card and a switch card as defined in the characterizing portions of claim 1 and 6, respectively, and to a switching node in a communications network as defined in the characterizing portion of claim 16.

BRIEF DESCRIPTION OF THE DRAWINGS

The present invention will become more fully understood from the detailed description provided hereinafter and the accompanying drawings, which are not necessarily to scale, and are given by way of illustration only. In addition, the use of spatial terms such as top, bottom, above, below etc. is for ease of explanation and should not be construed as structural or orientation limitations. In the different drawings, same reference numerals correspond to the same element.

FIGS. 9A-9B illustrate a solution for both cleaning the optical interfaces of the system cards when they are inserted into the switching device, and for preventing dust from gathering thereon once the cards are in position in the switching device, when the switching device is realized with free-space optical interconnect.

DETAILED DESCRIPTION

In the following description, for purposes of explanation and not limitation, specific details are set forth, such as particular network switch components and configurations, in order to provide a thorough understanding of the present invention. However, it will be apparent to one skilled in the art that the present invention may be practiced in other embodiments that depart from these specific details. In other instances, detailed descriptions of well-known network switch components and configurations are omitted so as to not obscure the description of the present invention with unnecessary detail. So for example will the electronic/optoelectronic details as well as the mechanical details of the network switching device according to the invention be much simplified for illustrative purposes.

Figure 1:
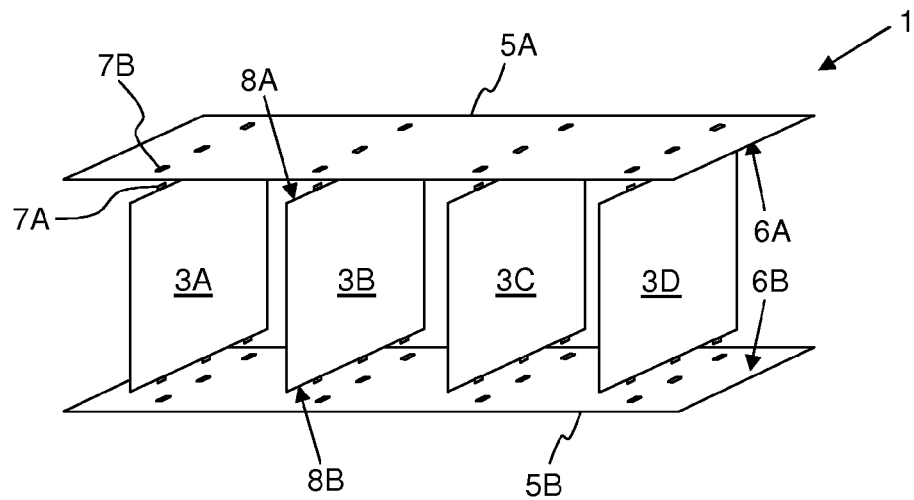
FIG. 1 schematically illustrates the arrangement of line cards and switching cards in a switching device according to the invention.

FIG. 1 schematically illustrates a network switching device 1 according to the invention. A plurality of line cards 3A-D facing each other with their flat sides are aligned in parallel, at a distance from each other. A first switch card 5A is arranged with one of its flat sides 6A facing and overlapping said line cards 3A-D. Preferably, the switch card 5A is arranged substantially perpendicular to the line cards 3A-D. An additional second switch card 5B is likewise arranged on the opposite side of the line cards 3A-D as compared to the first switch card 5A, substantially perpendicular to all line cards 3A-D with one of its flat sides 6B facing and overlapping said line cards 3A-D. The second switch card 5B is optional and is typically used only if redundant switching cards 5A-B are needed. Thus, the switching device 1 according to the invention may be realized as a (single) star or dual-star architecture, meaning that it comprises either one or two switch cards, which switch cards are arranged to communicate directly with all the line cards 3A-D of the system.

The line cards 3A-D and the switch cards 5A-B comprise connection means 7A-B arranged in a way that allows each switch card 5A-B to communicate directly with each line card 3A-D. The connection means 7A-B serve for the card-to-card communication in the switching device 1 and the connection means 7A-B thus define the card interconnect interface of the switching device 1.

The line card connection means 7A are arranged on or close to two opposite edges 8A-B of the line cards 3A-D, which edges 8A-B are intended to face the two switch cards 5A-5B. Corresponding and matching switch card connection means 7B are arranged on one flat side 6A-6B of each switch card 5A-5B to allow communication between said switch card connection means 7B and the line card connection means 7A when said flat sides 6A-6B are arranged to face and at least partially overlap the edges 8A-B of the line cards 3A-D on or close to which the line card connection means 7A are arranged.

The connection means 7A-B may be, e.g., high-speed electrical connectors, fibre-optic connectors or any other connector type known in the art. According to one embodiment, the connection means 7A-7B of either the switch cards 5A-B or the line cards 3A-D are balls of solder while the matching connection means are copper pads in a pattern matching the solder balls, similar to a ball grid array (BGA) connection. However, according to a preferred embodiment of the invention which will be further described below, the connection means 7A-B are free-space optical interconnects.

By arranging connection means 7A-B on a flat side 6A-6B of a switching card 5A-B, and on or close to an edge 8A-B of each of a plurality of line cards 3A-D, and arranging said cards 3A-D, 5A-B so that said flat side 6A-6B of the switch card 5A-B faces and at least partially overlaps said edges 8A-B of the line cards, the need for a backplane used in state-of-the-art switching devices for conveying signals between the switch card(s) and the various line cards is eliminated since the suggested card architecture allows the switch card(s) to communicate directly with each line card. Since the switching device 1 according to the invention can be realized without a backplane and since the switch card(s) and the line cards can communicate directly with each other, the switching device 1 can be made smaller in size and the length of the signalling paths are greatly reduced compared to prior-art switching devices.

Figure 2:
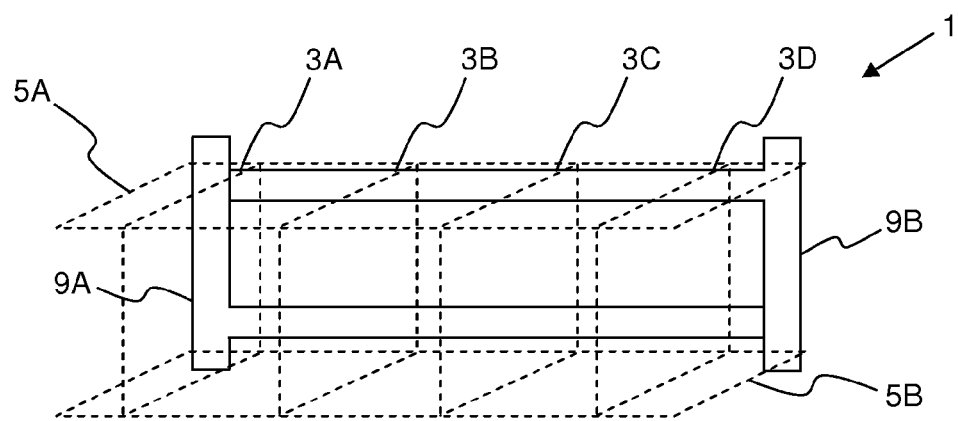
FIG. 2 schematically illustrates a switching device according to the invention comprising an additional backplane as an example separated into two physical parts.

An additional backplane may, however, still be used to carry power and potentially low speed control signals to the system cards 3A-D, 5A-B. As such an additional backplane does not need to convey high-speed signals between the system cards of the switching device, the backplane can be made very small in size. For example, as shown in FIG. 2 in which the line card and switch card assembly 3A-D, 5A-B is illustrated with dashed lines, such an additional backplane 9A can be L-shaped, having a vertical member connected to the switch card(s) 5A-B, and a horizontal member connected to each line card 3A-D. If needed, a second backplane 9B in form of a mirror-inverted 'L' turned upside-down can be arranged as illustrated to form a rectangular backplane frame together with the first backplane 9A. The L-shaped backplane(s) opens the back of the card assembly for air flow needed for system cooling.

When using one or several backplanes arranged substantially perpendicular to both the line cards 3A-D and the switch cards 5A-B, such as the backplanes 9A and 9B, the line cards 3A-D and the switch card(s) 5A-B are equipped with second connection means (not shown) arranged to be connected to corresponding connection means on the backplane(s). Such second connection means are then preferably arranged on or close to the edges of the switch and line cards that face the backplane, while corresponding and matching connection means are arranged on the flat side of the backplane(s) that faces and at least partially overlaps said edges of the switch and line cards. It should be appreciated that such connection means for system card-to-backplane communication need not support high-speed signal transmission as such connections typically only are used for transmission of power and potentially low speed control signals.

In addition to the above described cases in which the network switch device 1 does not comprise any backplane at all, or comprises one or two additional, small-sized backplanes 9A-B, the suggested network switch architecture in which the switch card(s) is arranged substantially perpendicular to all other system cards with which it needs to communicate, can of course also be used in conventional backplane systems, such as micro TCA systems. In such a case, the new kind of network switch architecture would provide a switch capacity upgrade.

Although the switching device 1 is shown to comprise four line cards 3A-D in this particular embodiment, it should be appreciated that the network switch 1 may comprise any given number of line cards 3A-D.

Figure 3A:
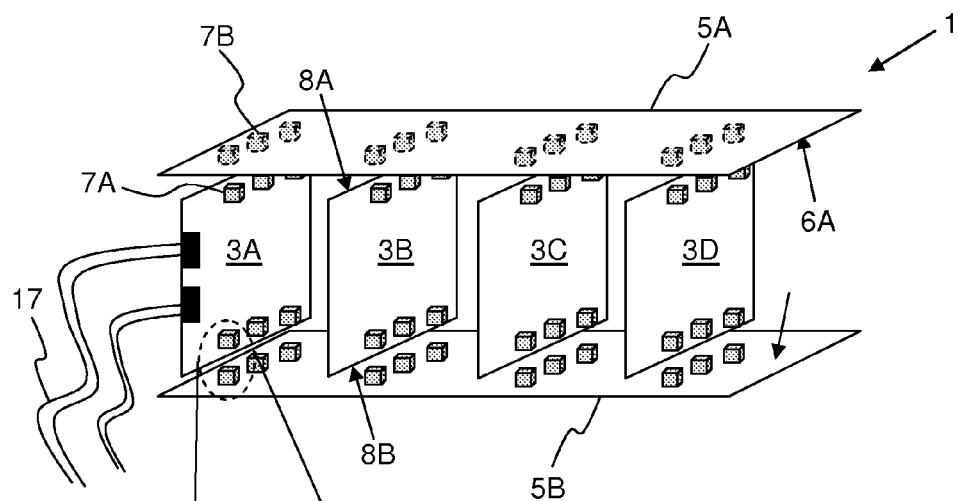
FIGS. 3A and 3B schematically illustrate an exemplary embodiment of the switching device according to the invention in which free-space optical interconnect is used for the line card-to-switch card communication.
Figure 3B:
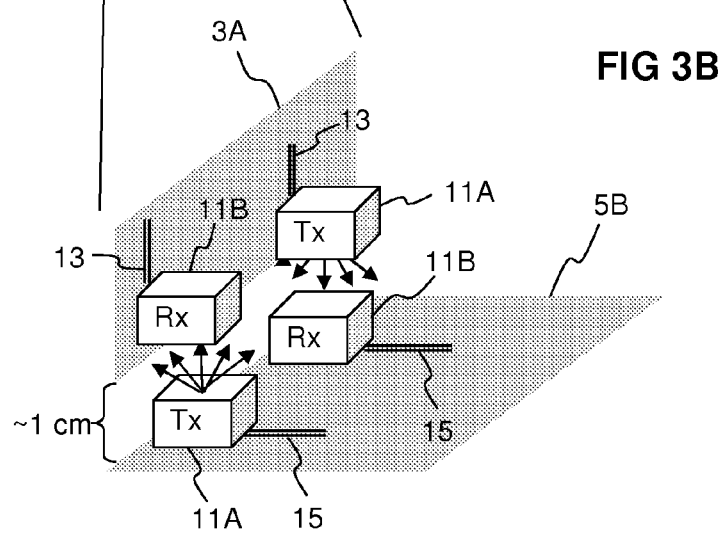

With reference to FIGS. 3A and 3B, a preferred embodiment of the switching device 1 according to present invention is shown, wherein a free-space optical interconnect (FSOI) is used for the card-to-card communication. In this embodiment, each line card connection means 7A and each switch card connection means 7B are seen to be an optical transceiver arrangement comprising one optical transmitter 11A and one optical receiver 11B. In FIG. 3A, the optical transceiver arrangements are indicated by grey boxes 7A-B on the cards: one group on the top and bottom sides 8A-B of each line card 3A-D and matching groups on the line card-facing sides 6A-B of the two switch cards 5A-B. That is, the optical transmitters 11A and receivers 11B of the system cards 3A-D, 5A-B in the switching device 1 are so arranged that when the switch card(s) 5A-B is placed perpendicular to all the other system cards 3A-D, each optical transmitter 11A of a particular system card 3A-D, 5A-B faces an optical receiver 11B of the card with which said particular card needs to communicate, and vice versa.

The switching device 1 according to the invention can use and benefit from the advantages of FSOI due to the fact that the distances between the cards that need to communicate with each other, and thus the distances between the optical transmitters 11A and receivers 11B, can be made very short with the suggested system card architecture. The distances between the line card edges facing the switch card(s) and the switch card(s) are typically in the order of 1 cm. The use of FSOI eliminates the need for optical connectors which are costly and also impractical to use since the system cards 3A-D, 5A-B of the switching device 1 preferably should be allowed to move relative to each other to render possible easy exchange of any particular system card in case of card failure, card upgrade etc. Furthermore, the FSOI is expected to require much less card space compared to conventional high-speed electrical connectors. The use of large size conventional high-speed electrical connectors limits the node internal communications capacity and/or forces the switching device to grow in size. The proposed FSOI solution hence eliminates the node physical size dimensioning problems imposed by conventional large size high-speed electrical connectors.

Each optical transmitter 11A and receiver 11B is connected to a high-speed electrical differential pair, annotated by reference numbers 13 and 15 for the line cards and the switch cards, respectively. On the line cards 3A-D, the electrical differential pairs 13 are typically connected to a fibre-optic interface 17 of each line card (only shown at card 3A in FIG.

3A for illustrative purposes), via logic circuits (not shown) for signal processing. By receiving and transmitting signals to and from communicating nodes or devices, the fibre-optic interfaces 17 of the line cards are the means allowing the switching device 1 to communicate with the outside world. On the switch card(s) 5A-B, the different electrical differential pairs 15 are interconnected to convey signals between the various line cards 3A-D of the system.

It should be appreciated that the number of optical transceiver arrangements and hence the number of optical transmitter/receiver pairs 11A-B on the switch card(s) 5A-B and each line card 3A-D may be chosen in dependence of the card-to-card communication speed requirements, and the switching device physical size requirements. For example, to provide a switching device 1 supporting 100 Gbit/s communications between the switch cards 5A-B and each line card 3A-D, four transmitter/receiver pairs 11A-B, such as vertical-cavity surface-emitting laser pin pairs (VCSEL-PIN pairs), each supporting 25 Gbit/s communication, can be used.

It should also be appreciated that other free space interconnects than optical interconnects can be used for the card-to-card communication in the switching device 1. For example, the present invention allows for free space radio interconnect between the line cards 3A-D and the switch card(s) 5A-B. That is, the optical transmitters 11A and receivers 11B can be exchanged for radio transmitters and receivers, in which case transmission power requirements are low due to the short distance between radio transmitters and receivers.

Figure 4:
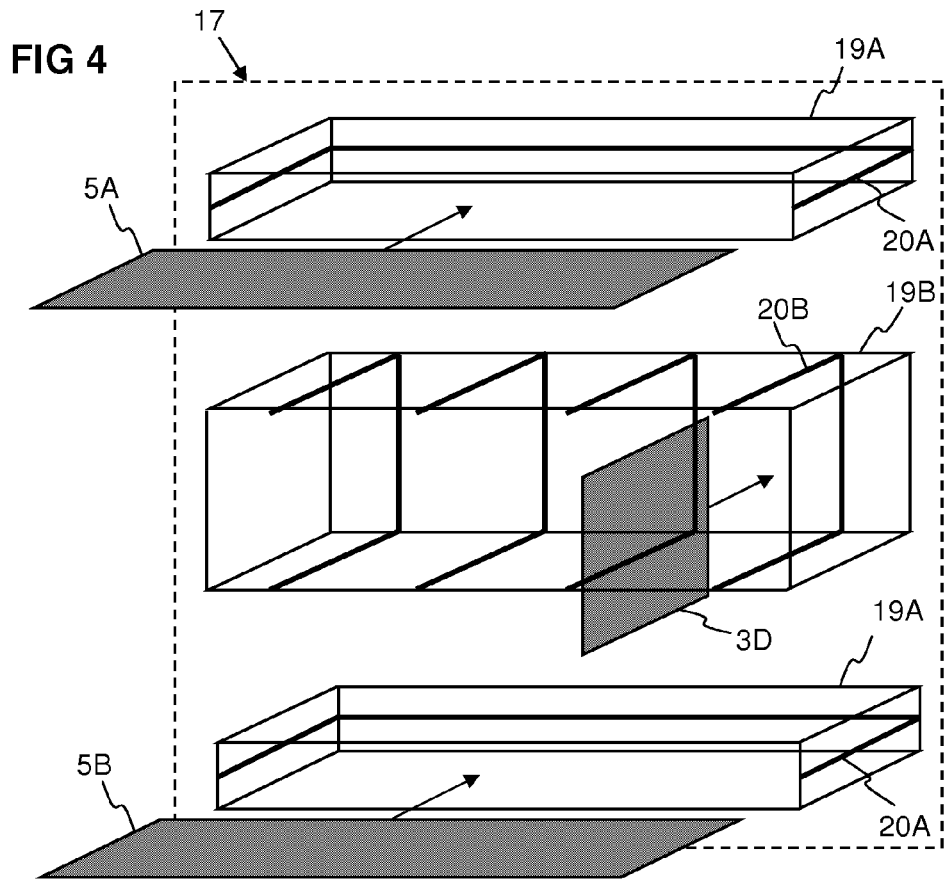
FIG. 4 illustrates a thread frame arrangement which may be used to arrange the line cards and switch cards in a way that allows use of free-space optic interconnect for the card-to-card communication.

With reference to FIG. 4, a thread frame arrangement 17 for the system cards 3A-D, 5A-B of the switching device according to the invention is shown. The frame arrangement 17 is particularly intended for the switching device illustrated in FIGS. 3A-B using FSOI, in which case the frame arrangement 17 makes the assembling of the switch system cards easy while allowing a card-to-card optical interconnect in free space. The frame arrangement 17 in seen to comprise two switch card thread frame portions 19A for holding a respective switch card, and one line card thread frame portion 19B for holding the plurality of line cards. The switch and line card frame portions 19A-B comprise card guiding members 20A and 20B arranged to receive and guide the switch cards 5A-B and the line cards 3A-D, respectively, into position when inserted in the frame arrangement 17. The card guiding members 20A-B may be designed in various ways but is in its simplest form a plastic or metallic guide rail having a groove into which the system cards are inserted. In the embodiment illustrated in FIG. 4, the guiding members 20A-B are seen to be U-shaped, with the opening of the 'U' facing what is intended to be the front side of the switching device 1. Although the switch card and line card frame portions 19A-B are illustrated as separate parts in FIG. 4 for illustrative purposes, it should be understood that the frame arrangement 17 just as well may be moulded in one piece. It should also be understood that the thread frame arrangement 17 only is an exemplary tool for rendering possible the assembling of the system cards while allowing FSOI for the card-to-card communication.

Figure 5:
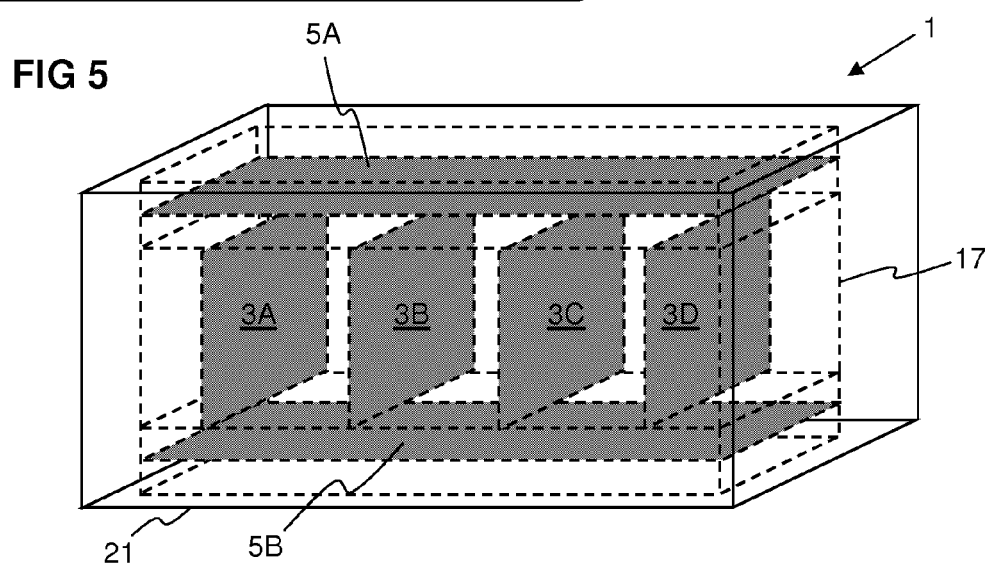
FIG. 5 schematically illustrates the thread frame arrangement illustrated in FIG. 4 filled with system cards and enclosed by a chassis to constitute a switching shelf.

FIG. 5 shows a network switching device 1 according to the invention, in which the frame arrangement 17 illustrated in FIG. 4 is filled with system cards 3A-D, 5A-B and located within an enclosure or chassis 21. The chassis 21 of the network switching device 1 is important to keep dust out of the system (and to reduce electromagnetic disturbance to/from the system). This is particularly important when using optic interconnects for the card-to-card communication since optic and fibre-optic equipment often is sensitive to dust. The frame arrangement 17 allows the system cards 3A-D, 5A-B to be easily removed from and inserted into the chassis 21. The cards are typically removed one by one by just pulling the card of choice out of the frame arrangement 17, but the frame arrangement may also be detachably arranged within the chassis 21 to allow the entire frame structure 17 to be pulled out of the chassis. It should also be understood that the frame arrangement 17 may be formed as an integral part of the chassis 21. As mentioned above, the frame arrangement 17 is merely an exemplary card-assembling means. A skilled person appreciates that there are various mechanical solutions for allowing the system cards to be detachably assembled as suggested by the invention. For example can the card guiding members 20A-B shown in FIG. 4 be attached directly to the inner walls of the chassis 21, in which case the chassis 21 simultaneously serves as system card-assembling means and system card enclosure.

Typically, the chassis 21 is shaped like an open box, partially or entirely missing a front side (the side from which the system cards 3A-D, 5A-B are removed/inserted). Instead, to prevent dust from entering the chassis 21, the system cards 3A-D, 5A-B are provided with front plates (shown in FIGS. 6B and 7) as well known in the art, which front plates form a substantially closed front wall of the chassis 21 when all cards are installed in the switching device 1. However, the chassis 21 may alternatively or in addition to the front plates of the system cards comprise an openable front side forming a "door" or a "lid" of the chassis 21.

Figure 6A:
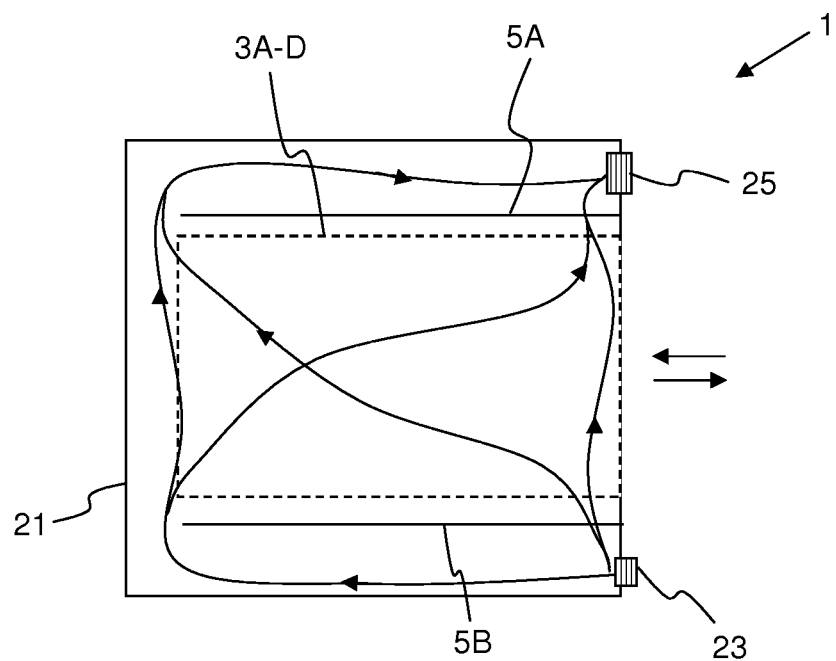
FIGS. 6A and 6B illustrate an exemplary architecture for forced air cooling of the switching device according to the invention.
Figure 6B:
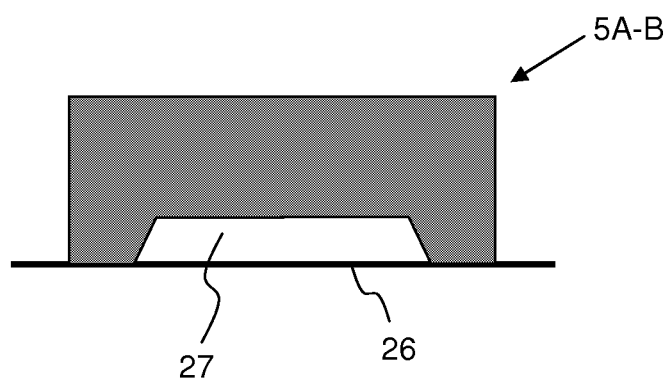

FIGS. 6A and 6B illustrate an exemplary architecture for forced air cooling of the switching device 1 according to the invention.

FIG. 6A shows a side view of the switching device 1 illustrated in FIG. 5, wherein the front side of the switching device 1 is seen on the right-hand side of the drawing, as indicated by the double arrows indicating the direction of insertion and extraction of the line cards 3A-D (illustrated with dashed lines) and the switch cards 5A-B. The chassis 21 comprises a small lower and upper front wall portion comprising an air inlet 23 and an air outlet 25, respectively. Typically, a fan (not shown) is used to drive air out of the outlet 25, thereby generating a continuous flow of air through the chassis 21, as indicated by flow lines having arrows indicating the direction of air flow. The size and shape of the air inlet 23 and the air outlet 25 are chosen so as to obtain the desired air flow through the chassis 21 and may, for example, be horizontally extending trays, of which at least the air inlet tray 23 preferably comprise a filter for preventing dust from entering the chassis 21.

The air cooling of the switching device may also be achieved by having small fans in the front of each system card 3A-D, 5A-B, in which case the fans preferably are mounted onto the above mentioned front plates of the system cards. This eliminates the need for a specific slot for fans in the chassis 21 and distributes the cost of fans to all cards. However, since the front plates of the vertically arranged line cards 3A-D, unlike the front plates of the horizontally arranged switch cards 5A-B, typically are not wide enough to allow for larger more powerful fans, the cooling effect may be limited.

FIG. 6B shows a top-view of an exemplary embodiment of a switch card 5A-B which is advantageously used in the switching device 1 illustrated in FIG. 6A. The plate indicated by reference numeral 26 can represent either a front plate of the switch card 5A-B, or an openable front wall of the chassis 21 against which the switch card 5A-B fits tight. The switch card 5A-B is punched so that is comprises a hole or slit 27 allowing the air to flow between the front plate/front wall of the chassis and the switch card. Thereby, the airflow within the chassis 21, and in particular the airflow past the line cards 3A-D arranged in between the two switch cards 5A-B, is increased. Of course, also the line cards and any additional backplane card may be punched in a similar way to further increase the air flow within the chassis 21.

As with all fibre-optical communication systems, care has to be taken regarding dust covering the optical transmitter and receivers when the switching device according to the invention is realized with FSOI.

Figure 7:
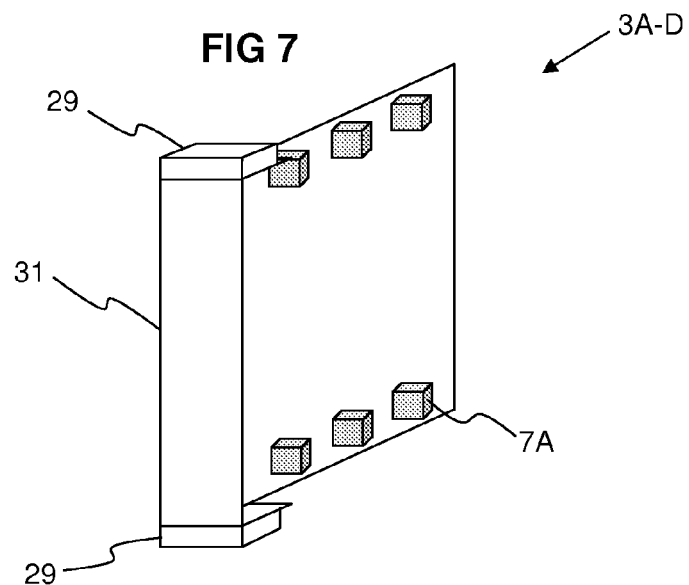
FIG. 7 illustrates an exemplary embodiment of a line card according to the invention, which line card comprises a front plate and a cleaning device for preventing dust from covering the optical interfaces of the system cards, when the switching device is realized with free-space optical interconnect.

FIG. 7 schematically illustrates a line card 3A-D. The communication means 7A of the line card 3A-D is illustrated with grey boxes, just as in FIG. 3A, and each grey box 7A should be understood as an optic transceiver arrangement comprising an optic transmitter and an optic receiver, as illustrated in more detail in FIG. 3B (reference numerals 11A and 11B, respectively). As mentioned above, both the line cards and the switch cards in the switching device according to the invention typically comprise front plates, such as the illustrated line card front plate 31. The front plates 31 are arranged perpendicular to the system cards at the edges that are intended to face the front side of the switching device in which the line cards are used, i.e. the side of the switching device from which the system cards can be inserted and removed. Besides serving the aforementioned purpose of forming a front wall of the switching device chassis 21 to prevent dust from entering the system, the front plates 31 are also intended to be grasped by a users hand when inserting/extracting the system cards to avoid static electricity discharge between the hand and the electronics/optoelectronics of the cards. For this purpose, the front plates 31 of the systems cards are typically equipped with some sort of handles (not shown).

The line card 3A-D further comprises cleaning devices 29 for automatically removing potential dust on the optic transmitters and receivers of the two switch cards each time said switch cards are moved into or out of the switching device. The cleaning devices 29 may be brush-like devices, soft and resilient polishing cushions, or the like. When the line cards 3A-3D are installed in the frame arrangement 17 (see FIGS. 4 and 5) and the switch cards 5A and 5B are inserted into or removed from the same, the optical transmitters 11A and receivers 11B (see FIG. 3B) of the switch cards 5A, 5B are gently swept against the cleaning devices 29 of the line card 3A-D and any potential dust on said transmitters/receivers is effectively removed. Similar cleaning devices could also be arranged on the switch cards for cleaning the optic transmitters/receivers of the line cards when said line cards are inserted into or extracted from the switching device.

Figure 8:
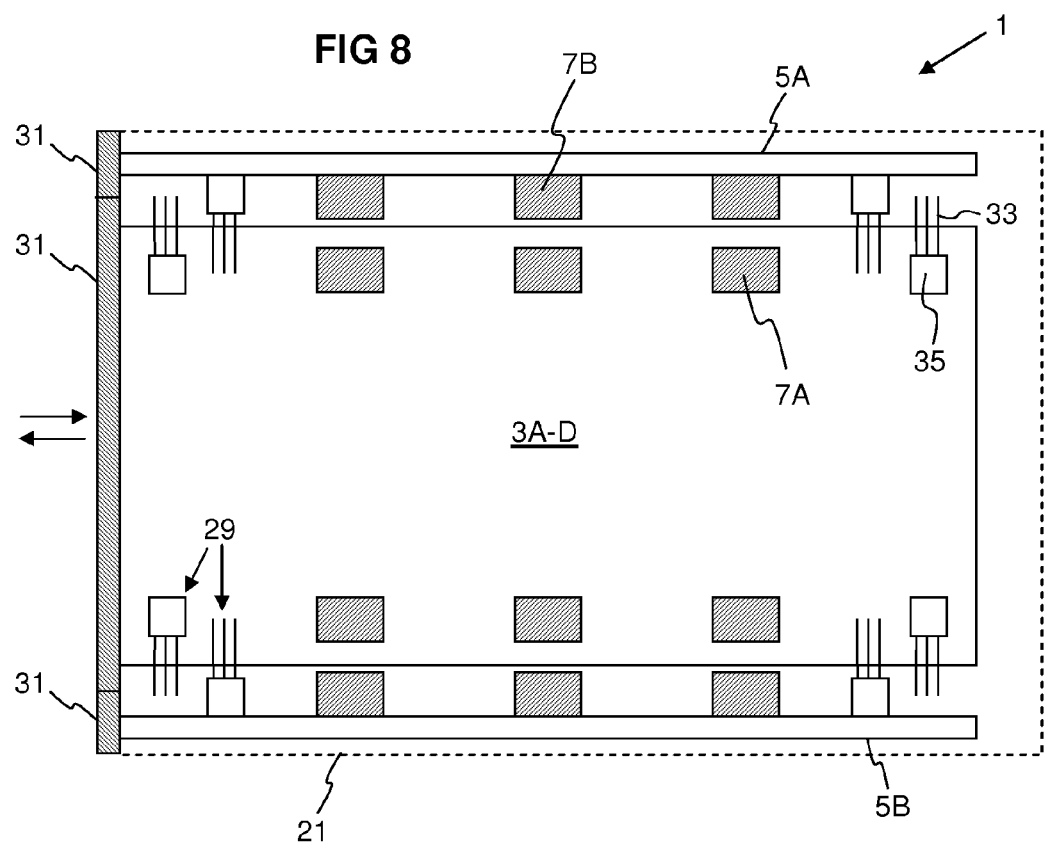
FIG. 8 illustrates an exemplary embodiment of the switching device according to the invention, wherein both the line cards and the switch cards comprise cleaning devices for preventing dust from covering the optical interfaces of the system cards, when the switching device is realized with free-space optical interconnect.

FIG. 8 illustrates a solution for removing dust from the optical transceiver arrangements of both a switch card and a line card when anyone of them is inserted into or removed from the switching device. The drawing schematically illustrates a side view of a FSOI switching device according to the invention wherein a line card 3A-D comprising optic transceiver arrangements 7A is seen in between two switch cards 5A and 5B comprising corresponding optic transceiver arrangements 7B. The front side of the switching device corresponds to the left-hand side of the drawing at which two arrows indicating the direction of insertion and removal of the system cards 3A-D, 5A-B are shown. The line cards 3A-D and the switch cards 5A-B comprise front plates 31, which front plates form a front wall of the switching device chassis 21 illustrated with dashed lines. The frame arrangement 17 shown in FIGS. 4 and 5 for holding the system cards in place within the chassis 21, as well as the air inlets and outlets shown in FIGS. 6A-B for providing air cooling to the switching device, have been omitted so as to not obscure the drawing with unnecessary detail.

In this embodiment, the line cards 3A-D and the switch cards 5A-B comprise cleaning devices 29 at each end of, and aligned with, each row of transceiver arrangements 7A-B. The cleaning devices 29 comprise "bristles" 33 protruding from supporting members 35 attached to the line cards 3A-D and switch cards 5A-B. The "bristles" 33 may of course be anything that is soft and bendable enough to not facet damage the optical transmitters/receivers, and bendable enough to allow the cleaning devices 29 of the switch cards 5A-B and the line cards 3A-D to pass each other when a card is inserted into or removed from the switching device. By placing a cleaning device 29 at each end of each row of optic transmitter/receiver pairs on both the line cards 3A-D and the switch cards 5A-B of the switching device, all optical transmitters/receivers of a first system card, as well as all optical transmitters/receivers of a second system card with which said first system card was/is intended to communicate, will be cleaned upon removal/insertion of said first system card.

Alternatively, or in combination with the above described cleaning devices 29, could a device arranged at each line card 3A-D and switch card 5A-B be made to uncover/cover the optic transmitters/receivers of a neighbouring card when said neighbouring card is inserted into/removed from the system. For example could a lid be made to slide away or slide in place when said neighbouring card is inserted or extracted, respectively.

Also, to prevent dust from gathering on the optic transmitters/receivers of the line cards 3A-D and switch cards 5A-B once they are installed, the switching device can comprise means for shielding the optical interfaces of the system cards from dust.

FIGS. 9A and 9B show such an exemplary embodiment of a switching device comprising means for shielding the optical interfaces of the system cards from dust once they are installed in the system. The switching device in FIGS. 9A and 9B also comprises cleaning devices 39 similar to the cleaning devices 29 described with reference to FIGS. 7 and 8. Here, however, the cleaning devices 39 are arranged on the thread frame arrangement 17 illustrated in FIGS. 4 and 5, instead of on the system cards.

In FIG. 9A, the line card thread frame portion 19B of the frame arrangement 17 is seen to comprise shielding bar arrangements 37 and cleaning devices 39. It should be understood that, typically, both the cleaning devices 39 and the shielding bar arrangements 37 are arranged at every line card guiding member 20B of the line card thread frame portion 19B although illustrated at different ones in the drawing for increased visibility. Also, for giving a clearer view of the shielding bar arrangement 37 and the cleaning devices 39, the switch card thread frame portions 19A shown in FIGS. 4 and 5 are not shown in FIG. 9A, although it should be understood that they typically are located over and under the line card thread frame portion 19B for holding the switch cards.

FIG. 9B illustrates a front view of a line card 3A-D and parts of two switch cards 5A-B when in position in a frame arrangement (not shown) comprising the shielding bar arrangements 37 and the cleaning devices 39 shown in FIG. 9A. The shielding bar arrangements 37 are seen to substantially enclose the optical transceiver arrangements 7A-B of the line and switch cards, thereby preventing dust from gathering on the surfaces of the optical transmitters/receivers (11A-B in FIG. 3B) once the system cards are inserted in the switching device.

The cleaning devices 39 are arranged to clean the optical transmitters and receivers of both the line cards and the switch cards when they are inserted into or removed from the frame arrangement. As seen in FIG. 9A, the cleaning devices 39 are located at or close to the front of the line card guiding members 20B. Therefore, in FIG. 9B, the optical transceiver arrangements 7A-B of the line and switch cards are located behind the cleaning devices 29 from the perspective of the viewer. The cleaning device 39 may be a soft and resilient polishing cushion, a brush-like device, or the like, against which the optical transceiver arrangements 7A-B of the line and switch cards are swept when inserted into or removed from the line and switch card thread frame portions 19A and 19B, respectively. By letting the cleaning devices 39 form a part of the frame arrangement 17 or the chassis into which the system cards are inserted, less cleaning devices 39 are needed to ensure that all optical interfaces 7A-B of a particular system card is cleaned when said card is inserted into the switching device, as compared to the case illustrated in FIG. 8 in which the cleaning devices 29 form parts of the system cards.

Another very important issue when it comes to free-space optical interconnects is the tolerance to misalignment between the transmitting and receiving device. The tolerance includes both the lateral misalignment in the parallel planes of the devices as well as the angular misalignment. It can be argued that the order of magnitude mechanical spatial uncertainty of cards communicating over a FSOI interface typically should be less than 1 mm in all directions. It can be shown that a 1 mm lateral misalignment with typical sized cards (e.g. microTCA) corresponds to less than 1° angular misalignment. As well known to a person skilled in the art, tolerances to lateral and angular misalignment of more than 1 mm and more than 1°, respectively, have been reported in several papers. Moreover, it can be argued that due to the fact that this invention does not need large arrays of FSOI (as is normally assumed in the art), but instead uses a small number of discrete interconnecting optical transmitter/receiver pairs, one can allow each optic beam to diverge significantly (given the amount of laser output power that is offered, and the minimal received power, i.e. the detector sensitivity). Therefore, the switching device according to the invention allows for the use of a FSOI for the card-to-card communication with increased lateral and angular misalignment tolerance.

The invention disclosed herein is targeting and ideally suited for the case of dual-star switching architectures, which is the most common architecture today. This architecture, in its basic form, utilizes high-speed communication only between two redundant switch cards and other cards of the system (i.e. not between non-switching cards). This architecture, and the proposed invention, applies to both access networks (fibre-optical access via point-to-point fibre or Passive Optical Networks (PONs), up to 10 Gbit/s), metro networks with large number of 10 Gbit/s and in the future 100 Gbit/s Ethernet connections, as well as core networks with 10/100G Ethernet, Synchronous Digital Hierarchy (SDH), Optical Transport Network (OTN), etc.

As discussed in the previous sections, the invention offers high speed board to board communication using free space optical interconnects eliminating the need for potential capacity and/or space limiting electrical high-speed backplanes. Thus, ultra high capacity systems of compact size are made possible without excessive systems cost.

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the scope of the invention as set forth in the appended claims.

Furthermore, the term "substantially perpendicular" occasionally used herein for specifying the position of the switch card(s) in relation to the line cards (and the position of any additional backplane in relation to the other system cards) should be interpreted in a wide sense. If the line cards are all of the same size and are all vertically aligned in the switching device, placing the switch card(s) horizontally, i.e. perpendicular to all the line cards, would minimize the size of the card assembly and the distance between the communication means of the line cards and switch card(s), respectively. However, if the communication means allow for communication at varying distances and/or non-perpendicular line card-to-switch card angles, the angle between the line cards and the switch card(s) may deviate from 90 degrees to an extent determined by the design and functionality of the connection means. Also, although the natural and most preferred way to implement the invention would be to arrange the switch card(s) perpendicular to the plurality of line cards, a person skilled in the art appreciates that there are other ways to realize the inventive switching device. For example, the vertical line cards may be arranged at different heights, in a stair-like kind of way, while the switch card is inclined to still allow communication between the communication means of the switch card and the line cards. Or, the line cards may be arranged in the same horizontal plane but tilt at an angle towards the vertical plane, while the switch card is horizontally arranged and hence non-perpendicular to said line cards. It should thus be understood that "substantially perpendicular" should in this context be construed broadly and, at least, as including arrangements in which the angle between the line cards and the switch card(s) is 90±45 degrees.

For the above reasons, it is contemplated that the claims will cover any such modifications or embodiments that fall within the true scope of the invention.

The invention claimed is:

1. A switching device for communications networks comprising
    a plurality of line cards aligned in parallel with their flat sides facing each other, each line card comprising connection means arranged on or close to an edge of said line card,
    at least one switch card comprising matching connection means arranged on a flat side of said at least one switch card and adapted for communication with the connection means of the line cards, characterized in that said at least one switch card is arranged substantially perpendicular to said plurality of line cards with said flat side facing and at least partially overlapping said edges of the line cards, such that interconnection is achieved between the connection means of the line cards and the matching connection means of the at least one switch card, and
    a backplane comprising connection means arranged on a flat side of said backplane, wherein the line cards further comprise second connection means on or close to a second edge of the line cards, the backplane being arranged substantially perpendicular to both the line cards and the at least one switch card with said flat side of the backplane facing and at least partially overlapping said second edges of the line cards such that interconnection is achieved between said second connection means of the line cards and the connection means of the backplane.

2. The switching device according to claim 1, wherein the connection means of the line cards and the at least one switch card are high-speed electrical connectors.

3. The switching device according to claim 1, wherein said connection means of the line cards and the at least one switch card are fibre-optic connectors.

4. The switching device according to claim 1, wherein said connection means of the line cards and the at least one switch card are a plurality of optical transceiver arrangements providing for free-space optical interconnect between said line cards and said at least one switch card.

5. The switching device according to claim 1, wherein the at least one switch card further comprise second connection means on or close to a second edge of said switch card, the backplane being arranged substantially perpendicular to both the line cards and the at least one switch card with said flat side of the backplane facing and at least partially overlapping said second edge of the at least one switch card such that interconnection is achieved between said second connections means of the at least one switch card and the connection means of the backplane.

6. The switching device according to claim 1, further comprising a card-assembling means, said card assembling means comprises means for allowing said plurality of line cards and said at least one switch card to be detachably inserted into said card-assembling means in such a way that, when inserted, said line cards are aligned in parallel, facing each other with their flat sides and having the edges on or close to which communication means are arranged pointing in the same direction, and said at least one switch card is arranged substantially perpendicular to said line cards with the flat side on which the connection means are arranged facing and at least partially overlapping said edges of the line cards.

7. The switching device according to claim 6, wherein said connection means are optical transceiver arrangements and said card-assembling means comprises cleaning devices arranged to remove dust from the optical transceiver arrangements of a card that is inserted into or extracted from said card-assembling means.

8. The switching device according to claim 7, wherein said card-assembling means further comprises shielding means arranged to shield the optical transceiver arrangements of the cards from dust when said cards are assembled in said card-assembling means.

9. A switching node for a communications network, wherein said switching node comprises at least one switching device according to claim 1.

\* \* \* \* \*